United States Patent [19]

Seifert et al.

[11] 4,277,036

[45] Jul. 7, 1981

[54] AUTOMATIC WIND-UP ROLLER FOR A SAFETY BELT

[75] Inventors: Helmut Seifert, Schwäbisch Gmünd; Wolf-Dieter Hönl, Mutlangen; Johannes Schmid, Schwäbisch Gmünd-Hussehhofen; Bernhard Frei, Waldstetten, all of Fed. Rep. of Germany

[73] Assignee: Repa Feinstanzwerk GmbH, Alfdorf, Fed. Rep. of Germany

[21] Appl. No.: 48,184

[22] Filed: Jun. 13, 1979

[30] Foreign Application Priority Data

Jun. 15, 1978 [DE] Fed. Rep. of Germany ....... 2826286

[51] Int. Cl.³ .................... A62B 35/02; B65H 75/48
[52] U.S. Cl. .................... 242/107.4 A; 242/107.4 B
[58] Field of Search ............ 242/107.4 R, 107.4 E; 280/806–808; 297/478, 480

[56] References Cited

U.S. PATENT DOCUMENTS

| 2,708,555 | 5/1955 | Heinemann et al. | 242/107.4 A |
| 2,953,315 | 9/1960 | Lautier et al. | 242/107.4 B |
| 3,741,496 | 6/1973 | Beller | 242/107.4 A |
| 3,889,898 | 6/1975 | Ziv | 242/107.4 A |
| 4,044,969 | 8/1977 | Wallin | 242/107.4 A |
| 4,083,512 | 4/1978 | Rumpf | 242/107.4 A |
| 4,148,446 | 4/1979 | Sugar | 242/107.4 A |

*Primary Examiner*—John M. Jillions
*Attorney, Agent, or Firm*—Herbert L. Lerner

[57] ABSTRACT

Automatic wind-up roller for a safety belt with means to block the belt roller in case of danger. The wind-up roller has an automatic release mechanism which is activated when the vehicle exceeds a predetermined acceleration or deceleration. The automatic release mechanism when activated in turn activates a control element, wherein at least two locking pawls, preferably arranged at opposite sides of the belt shaft, are caused to interact with locking tooth means to block the belt roller. Means are provided to obtain simultaneous operation of both pawls by a single control element.

1 Claim, 5 Drawing Figures

AUTOMATIC WIND-UP ROLLER FOR A SAFETY BELT

BACKGROUND OF THE INVENTION

1. Field of the Invention

The invention relates to an automatic wind-up roller for safety belts with a provision to block the belt roller in case of danger. An automatic release mechanism is activated when the vehicle exceeds a permissible acceleration or deceleration, and the release mechanism activates a control element which activates a locking pawl device.

2. Description of the Prior Art

In known automatic wind-up rollers for safety belts of the abovementioned type (U.S. Pat. No. 3,901,459), a wind-up spring is arranged on one side of the belt shaft while the opposite end of the shaft is connected with a locking pawl and with a release mechanism. In case of danger, i.e. when acceleration or deceleration exceeds a permissible level, the release mechanism, which for example, can be provided with inertia mass, acts on a control disc and this control disc effects blocking of the belt shaft through the locking pawl. In these known locking pawl devices, the danger exists that the single pawl lock on one side of the belt shaft is not sufficient to withstand the extremely high pull-forces.

SUMMARY OF THE INVENTION

An object of the instant invention is to provide an automatic wind-up roller for safety belts of a relatively simple construction and improved locking reliability with a locking mechanism capable of withstanding extremely high pull-forces.

With the foregoing and other objects in view, there is provided in accordance with the invention, an automatic wind-up roller for a safety belt of a vehicle with means to block a belt shaft on which the safety belt is wound in case of danger, having a housing, a belt shaft rotatably supported in the housing, a safety belt rolled around the belt shaft, a relase mechanism which is activated when a predetermined acceleration or deceleration of the vehicle is exceeded, a single control element activated by the release mechanism, at least two locking pawls activated simultaneously by said single control element, said locking pawls when activated simultaneously interacting with locking tooth means to block said belt shaft.

Other features which are considered as characteristic for the invention are set forth in the appended claims. Although the invention is illustrated and described herein as embodied in an automatic wind-up roller for a safety belt, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

In accordance with the invention, there are at least two locking pawls which, preferably are disposed on opposite sides of the belt shaft and interlock with suitable locking teeth. These locking pawls are simultaneously operated by a single control element. It is particularly important that, with the double-sided arrangement of the locking pawls, the belt shaft is not exposed to tilting forces when the blocking occurs and remains in its exact centralized position so that the locking teeth connected to the belt shaft are exactly in the predetermined lock-position relative to the pawl.

In this arrangement, locking tooth means and a locking pawl having at least two teeth can be provided on each side of the belt shaft. According to another preferred embodiment, on each side of the belt shaft locking tooth means and two locking pawls may be provided, which pawls are simultaneously activated by the control element, preferably in opposite direction. The construction is simplified, particularly with locking pawls which can be operated radially from the inside towards the outside, by arranging the two locking pawls hingeably or pivotally on a frontal surface on both sides of the belt shaft so that they are tensioned against each other by a single tension spring.

It is particularly advantageous with locking pawls which operate from the inside to the outside, if one or several connecting shafts which connect the locking pawls which are disposed on the opposite side of the belt shaft and move into the lock-position radially away from the belt axis, are arranged within the belt shaft. The belt shaft, at least partly, is constructed with a hollow profile to accommodate the connecting rods. Since the connecting rods are embedded in the belt shaft, they are thereby protected against detrimental influences from the outside.

When employing locking pawls which operate radially from the outside to the inside, it is desirable to have the connecting rod disposed in a spacer tube which connects the two side plates of the housing of the automatic wind-up roller, thus protecting the connecting shaft from exterior influences.

Further advantageous details of the invention are explained with reference to the drawings and described in the following.

FIGS. 1 to 5 show four different embodiments of the automatic wind-up roller for safety belts according to the invention with a locking pawl provision which locks radially from the inside to the outside.

Figure 1:
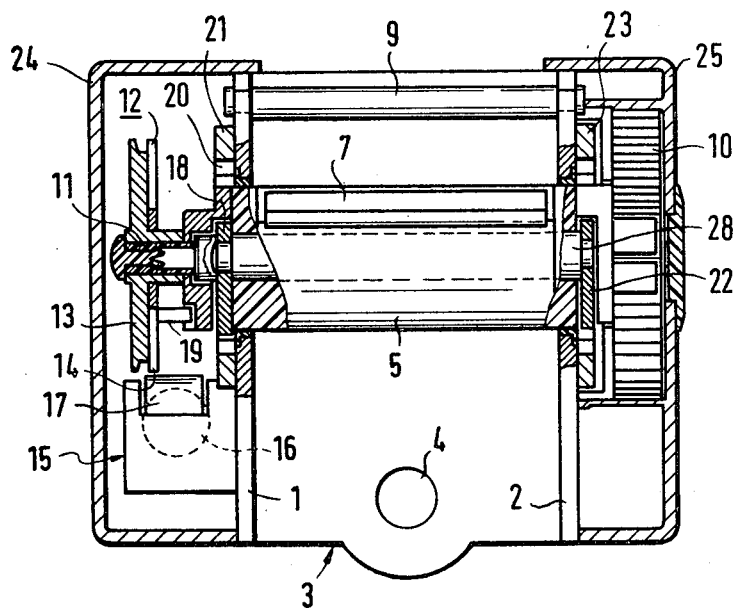
FIG. 1 is a front-sectional view of the automatic wind-up roller for safety belts in accordance with the invention, taken along line I—I of FIG. 2.

In FIG. 1, a belt shaft 5 is rotatably supported in two side plates 1 and 2 of an essentially C-shaped frame 3, which latter serves for securing the automatic wind-up roller in a vehicle. The frame 3 is provided with a fastening opening 4 for securing the wind-up roller to, for example, the frame of the vehicle. The belt shaft 5 has a slot 6 (FIG. 2) which extends radially along the belt axis 5 in known manner. A safety belt 8 which can be made of textile material, and with an enlarged portion 7 for securing it, has its free belt end inserted in slot 6 and held therein. The two side plates 1 and 2 are kept apart an exact distance by a spacer member 9. A wind-up spring 10 is fastened at one end of the belt shaft 5 which extends beyond the side plate 2. A control disc 12 is rotatably supported on a thin support protrusion 11 of the belt shaft 5 outside of and at the side of the opposite side plate 1. The control disc 12 is adjacent and normally rotates with an inertia disc 13. A release mechanism 15 with a ball 16 and a control lever 17 is in functional connection with flexible control teeth 14 of the control disc 12. In case of danger, i.e. when acceleration or deceleration of the vehicle exceeds a predetermined level, the ball 16 moves away from its rest position, and displaces the control lever 17 in the direction of the control disc 12, interacting with the control disc 12, thereby stopping rotation of the control disc 12. The belt shaft 5, however continues to rotate, if only for a short distance, with resulting relative motion, between the belt shaft 5 and the control disc 12. This relative motion causes a spring-loaded locking pawl 18 fastened at a frontal surface of the belt shaft 5, to be moved by means of a protrusion 19 on the control disc 12. Movement of locking pawl 18 is radial with respect to the belt axis 5, from the inside to the outside, causing coupling tooth 27 of pawl 18 to couple with the inner teeth 20 of a lock ring 21 which is secured to the side plate 1. As will be explained with the aid of the following embodiments, the locking pawl 18 is connected to another locking pawl 22 in the region between the wind-up spring 10 and the side plate 2, by means of a connecting rod axially parallel to belt shaft 5. Locking pawl 22 engages with an internally toothed locking ring 23 in the same manner as locking pawl 18 couples with locking ring 21. Covers 24 and 25 are fitted onto side plates 1 and 2.

Figure 2:
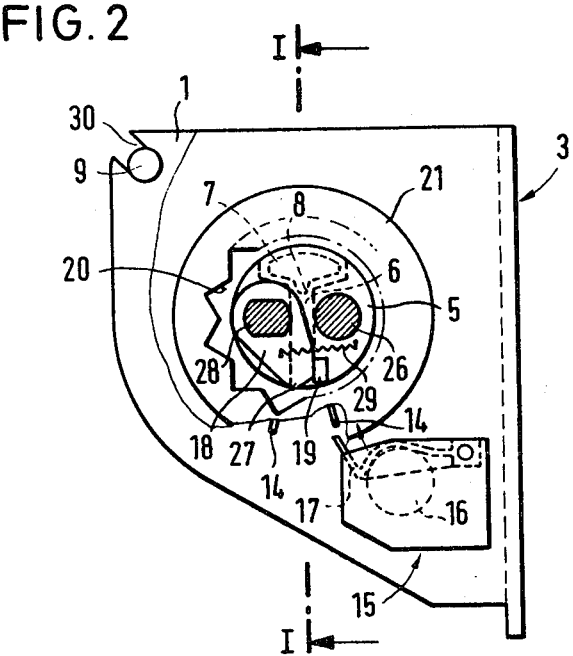
FIG. 2 is a side view in partial section, of the automatic wind-up roller for a safety belt, showing the release mechanism, control disc, locking pawl, inner locking teeth and connecting rod which connects pawls on both sides of the belt shaft.

According to the embodiment in FIG. 2, the belt shaft 5 which is made of synthetic material, i.e. plastic, has a reinforcement member 26 made, for example, as a metal rod which extends through the belt shaft 5, parallel to its axis for the purpose of stabilizing, that is, strengthening the belt shaft 5. The locking pawls 18 and 22 which are arranged at the two opposing sides of the belt shaft 5 have the shape of a one-armed lever and are each provided with one coupling tooth 27. Both locking pawls 18 and 22 are in fixed connection with each other through a connecting shaft or connecting rod 28. In FIG. 2, is seen the projection or control lug 19 also shown in FIG. 1. When relative motion between the control disc 12 and the belt shaft 5 occurs, the lug 19 moves the locking pawl 18 in a direction opposite to the force of a spring 29 into the locked position, in which position the coupling tooth 27 is in engagement with the inner teeth 20 of the lock-ring 21. Further shown in FIG. 2 is the release mechanism generally designated as 15 and also an elastic control tooth 14 of the control disc 12. In the corner of the two side plates 1 and 2 of frame 3 are two elongated hole-like cutouts 30 which are open towards the ouside. The ends of spacer member 9 can readily be inserted into cutouts 30 from the outside and secured there.

Figure 3:
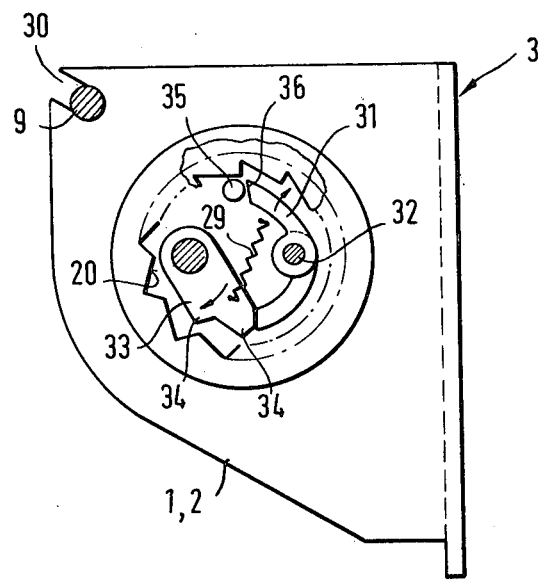
FIG. 3 is another embodiment of the automatic wind-up roller shown as a side view in partial section in which an operating lever has coupling teeth to engage locking teeth and also moves a pawl with coupling teeth to engage locking teeth.

In FIG. 3, at a frontal surface of the belt shaft there is an approximately half-moon-shaped operating level 31, rotatable at its axis 32 and also a locking pawl 33 with coupling teeth 34, similar to a locking pawl at the opposite side of the belt shaft 2. With relative motion between the belt shaft 5 and a control disc 12 caused, for example, by sudden change in acceleration of the vehicle as described previously, the operating lever 31 is rotated by the control projection 35 extending from the control disc whereby, on one hand, the operating lever 31 with its coupling tooth 36 engages the locking teeth 20 and, on the other hand, the locking pawls 33 with their coupling teeth 34 engage the locking teeth in a direction opposite to the force of the spring 29 as shown by the arrows.

Figure 4:
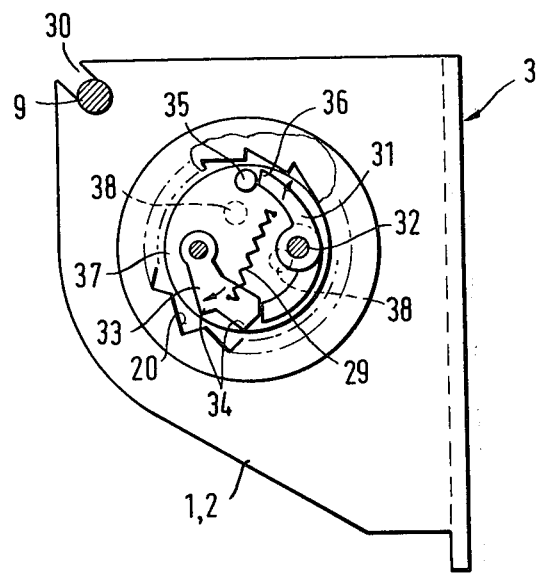
FIG. 4 illustrates a variant of the automatic wind-up roller in FIG. 3, differing principally in the belt shaft having a mounting flange and several rod-shaped reinforcement members.

The embodiment of FIG. 4 differs essentially from the embodiment of FIG. 3 by the feature that the belt shaft 5 which is provided with a mounting flange 37 has several rod-shaped reinforcement members 38.

Figure 5:
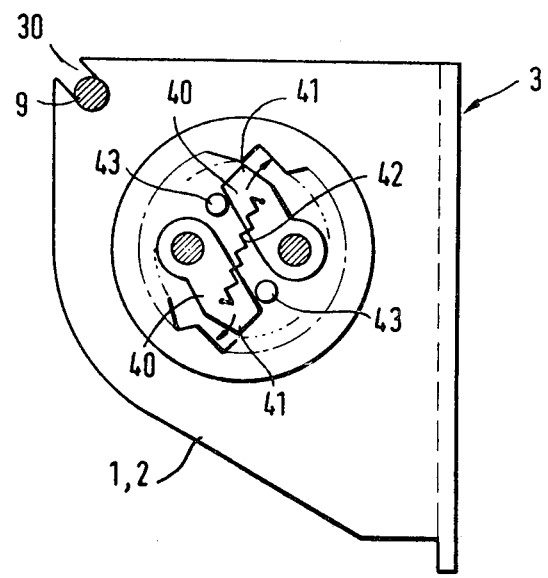
FIG. 5 illustrates in a side view, an embodiment in which there are two locking pawls separated by a gap on a mounting flange at the end of the belt shaft.

In FIG. 5, on each side of the belt shaft 5 (FIG. 1) are two locking pawls 40, adjustably secured to the mounting flange 37 shown in FIG. 4. The locking pawls 40 in FIG. 5, are formed as one-armed levers, each pawl provided with one locking tooth 41. The locking pawls 40 in the rest position are substantially parallel to each other, are arranged in opposite directions to each other, and are tensioned with each other by a single tension spring 42. Two control projections 43 are disposed in the gap between the two opposing sides of the locking pawls 40. When a relative motion between the belt shaft 5 and the control disc 12 (FIG. 1) occurs control projections move the locking pawls 40 simultaneously radially from inside toward the outside and bring the coupling teeth 41 into engagement with the inner locking teeth 20 which are only partially shown.

There are claimed:

1. Automatic wind-up roller for a safety belt of a vehicle with means to block a belt shaft on which the safety belt is wound in case of danger, having a housing, a belt shaft rotatably supported in the housing, a safety belt rolled around the belt shaft, a release mechanism which is activated when a predetermined acceleration or deceleration of the vehicle is exceeded, a single control element arranged on the axis of said belt shaft at one end of the belt shaft to normally rotate with the belt shaft, activated by the release mechanism, at least two locking pawls with at least one locking pawl at each end of the belt shaft activated simultaneously by said single control element, locking tooth means at each end of the belt shaft for engagement with the locking pawls, said locking pawls when activated simultaneously interacting with said locking tooth means to block said belt shaft, and wherein at least one connecting shaft connects said locking pawls arranged at each end of the belt shaft and which locking pawls are movable radially into the locking position away from the belt shaft axis, said belt shaft having a hollow space for the disposition of said connecting rod.

* * * * *